United States Patent [19]
Houlihan et al.

[11] 3,879,462
[45] Apr. 22, 1975

[54] AMINO SUBSTITUTED TETRAHYDROPLEIADENES

[75] Inventors: William J. Houlihan, Mountain Lakes; Jeffrey Nadelson, Lake Parsippany, both of N.J.

[73] Assignee: Sandoz-Wander, Inc., Hanover, N.J.

[22] Filed: June 4, 1973

[21] Appl. No.: 366,764

[52] U.S. Cl. ....... 260/570.9; 260/345.2; 260/501.1; 260/501.21; 260/518 R; 260/544 M; 260/558 A; 424/330
[51] Int. Cl. ............................................ C07c 87/28
[58] Field of Search .................. 260/570.9; 424/330

[56] References Cited
UNITED STATES PATENTS
3,441,567   4/1969   Galantay...................... 260/570.9 X

*Primary Examiner*—Robert V. Hines
*Attorney, Agent, or Firm*—Gerald D. Sharkin; Robert S. Honor; Thomas O. McGovern

[57] ABSTRACT

1,2,3,12a-tetrahydro-1-(substituted-aminomethyl)-7-methylene-7(12H) pleiadenes, e.g., 1,2,3,12a-tetrahydro-1-(dimethylaminomethyl)-7-methylene-7(12H)-pleiadene, prepared by various methods including acid dehydration of the corresponding 1,2,3,12a-tetrahydro-1-(dimethylaminomethyl)-7-methyl-7(12H)-pleiaden-7-ols, are useful as anti-depressants.

5 Claims, No Drawings

AMINO SUBSTITUTED TETRAHYDROPLEIADENES

This invention relates to amino-substituted tetrahydropleiadenes. More particularly, it relates to 1,2,3,12-a-tetrahydro-1-(substituted-aminomethyl)-7-methylene-7(12H)-pleiadenes, acid addition salts thereof, intermediates thereof, and processes for their preparation.

The compounds of this invention may be represented by the following structural formula:

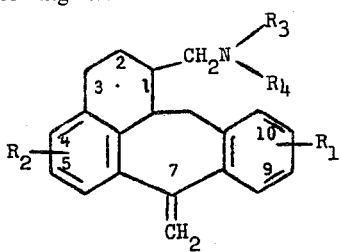

wherein
$R_1$ and $R_2$ each independently represent hydrogen or fluoro, and
$R_3$ and $R_4$ each independently represent lower alkyl having 1 to 2 carbon atoms, i.e., methyl and ethyl, provided $R_1$ is in the 9 or 10 position and $R_2$ is in the 4 or 5 position.

The compounds of formula (I) may be prepared by the following reaction scheme:

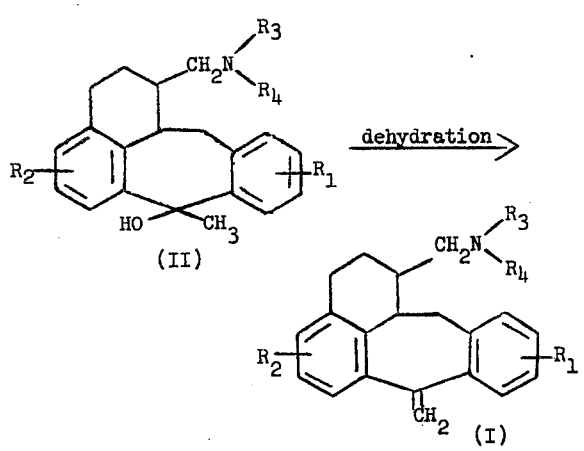

wherein $R_1$, $R_2$, $R_3$, $R_4$ and the proviso are as defined above.

The compounds of formula (I) may be prepared by treating a compound of formula (II) with a dehydrating agent such as dilute or concentrated mineral acids, e.g., sulfuric acid, hydrochloric acid and the like, iodine, phosphorus oxychloride, or thionyl chloride, an alkylsulfonyl or arylsulfonyl chloride such as methanesulfonyl chloride or benzenesulfonyl chloride or an inorganic acid or Lewis acid used in the solid state form. Examples of the last two acid types are potassium bisulphate, boric acid, aluminum oxide, ferric chloride and silicon dioxide. When phosphorus oxychloride or thionyl chloride or an alkylsulfonyl or arylsulfonyl chloride is used as the dehydrating agent, it is preferred that an acid binding agent such as a lower alkyl tertiary amine wherein the alkyl contains 1 to 4 carbon atoms, e.g., triethylamine be used. The reaction utilizing these dehydrating agents as well as that using the solid inorganic acids and Lewis acids may be conveniently carried out in inert hydrocarbons such as benzene, toluene and the like, at a temperature from about 50°C to the reflux temperature of the reaction medium, preferably at the reflux temperature for about 1 to 24 hours, preferably 1 to 4 hours. The preferred dehydration medium is 1M to 5M sulfuric acid. Neither the solvent nor the temperatures used are critical.

The compounds of formula (II) are novel and may be prepared by the following reaction scheme:

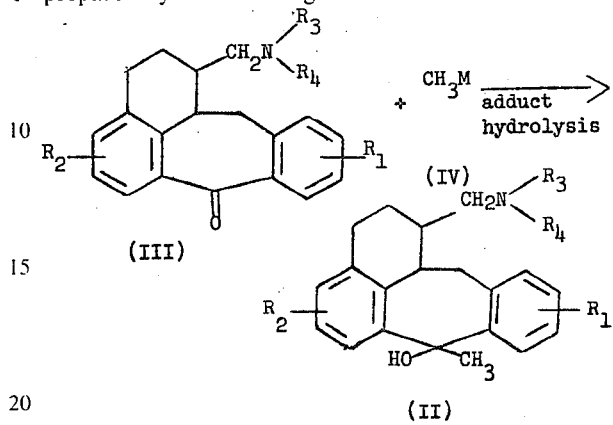

wherein
$R_1$, $R_2$, $R_3$, $R_4$ and the proviso are as defined above and
M is Li or MgY' and
Y' is halo having an atomic weight of 35 to 127.

The compounds of formula (II) may be prepared by treating a compound of formula (III) with an organometallic reagent of formula (IV), e.g., methyllithium, and the like in the presence of an inert atmosphere, e.g., nitrogen gas, in an inert solvent, such as diethyl ether, tetrahydrofuran, benzene, toluene and the like. When M is Li, the reaction is carried out at a temperature of from −20° to +25°C., preferably −5° to +5°C. for about 5 to 45 minutes, preferably 10 to 20 minutes. When M is MgY' the reaction is carried out at a temperature of 10° to 30°C., for about 1 to 6 hours, preferably 3 to 5 hours followed by standard hydrolysis of the resulting adduct with e.g. water or aqueous ammonium chloride solution. Neither the solvents nor the temperatures used are critical.

The compounds of formula (III) are a further aspect of this invention and may be prepared by the following reaction scheme:

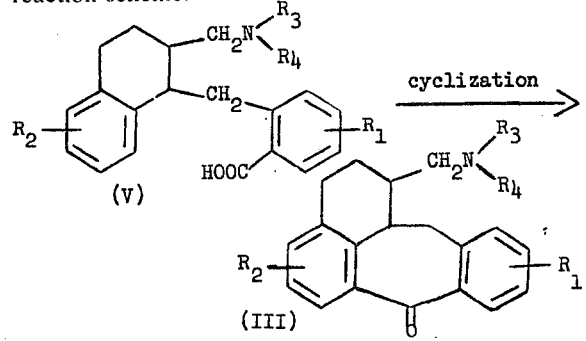

where $R_1$, $R_2$, $R_3$, $R_4$ and the proviso are as defined above.

The compounds of formula (III) may be prepared by acidic cyclization of a compound of formula (V), e.g., in a strong Lewis acid medium such as stannic tetrachloride, ferric chloride, titanium tetrachloride and the like, or in strong mineral acid medium such as concentrated sulfuric acid, phosphoric acid, polyphosphoric acid and the like. When a Lewis acid is used, the reaction may be carried out in an inert solvent such as dichloromethane, carbon tetrachloride, carbon disulfide, nitrobenzene and the like. A solvent is not necessary when a strong mineral acid is used but solvents such as those employed for the Lewis acid may be utilized. The cyclization may be carried out at temperatures from about 20°C. to 150°C., preferably from about 100°C. to about 120°C., for about 2 to 10 hours preferably for about 3 to 5 hours. Neither the solvents nor the temperatures used are critical.

The compounds of formula (V) are prepared by the following reaction scheme:

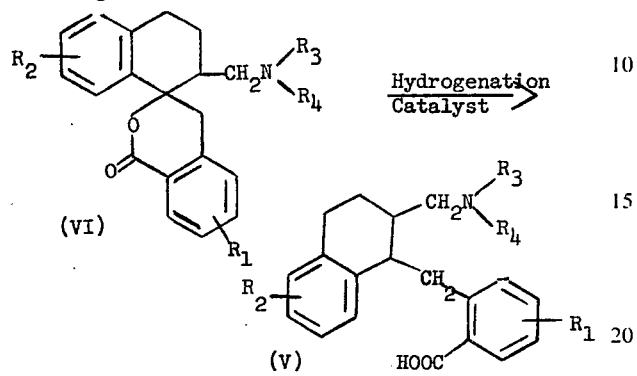

where $R_1$, $R_2$, $R_3$, $R_4$ and the proviso are as defined above.

The compounds of formula (V) may be prepared by hydrogenating a compound of formula (VI) in the presence of a noble metal catalyst such as palladium, platinum, rhodium and the like, optionally neat or on a support such as charcoal, at an atmosphere of from 35 to 100 psi preferably 50 to 55 psi, in an inert lower alkanol having 1 to 4 carbon atoms, such as methanol, ethanol, propanol, isopropanol, butanol, isobutanol or acetic acid, at a temperature of from 20° to 80°C. preferably 25° to 35°C., until one equivalent amount of hydrogen is absorbed. To enhance the reaction, aqueous mineral acid such as hydrochloric acid, sulfuric acid or perchloric acid may be added to the reaction medium. The preferred catalyst is 10% palladium on charcoal. Neither the solvents, temperatures or pressures used are critical.

The acid chloride of compound (V) may be prepared by conventional techniques, e.g., treating compound (V) with thionyl chloride in a solvent such as methylene chloride. The straight chain 1–4 carbon alkyl esters of the acid (V) are prepared by conventional techniques.

A further method of preparing compounds (V) from compounds (VI) is shown by the following reaction scheme:

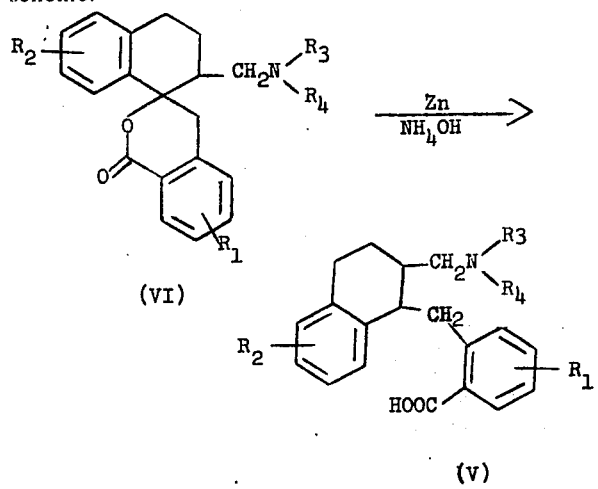

where $R_1$, $R_2$, $R_3$, $R_4$ and the proviso are as defined above.

The compounds of formula (V) may be prepared by reducing a compound of formula (VI) using a zinc-ammonium hydroxide reduction system optionally in the presence of cupric sulfate. Although a solvent is not required, it is preferred that the reaction be carried out in the presence of an inert organic solvent such as the lower alkanols, e.g., methanol, ethanol and the like, especially ethanol. The temperature of the reaction is not critical, but it is preferred that the reaction be carried out at temperatures from about 60° to 100°C., preferably 75° to 85°C. The reaction may be run from about 24 to 48 hours, preferably 28 to 30 hours.

The compounds of formula (VI) as an additional aspect to this invention are prepared according to the following reaction scheme:

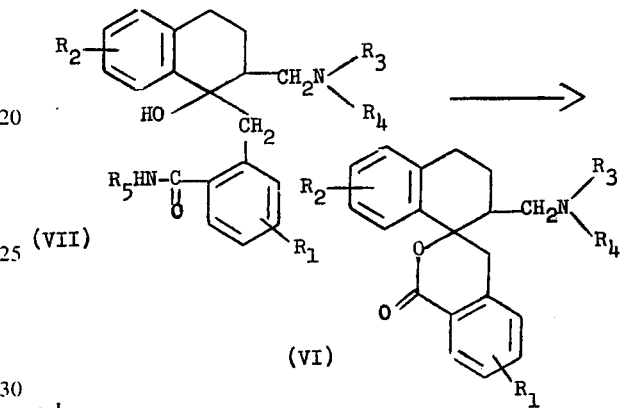

where
$R_1$, $R_2$, $R_3$, $R_4$ and the proviso are as defined above, and
$R_5$ represents lower alkyl, i.e., alkyl having 1 to 4 carbon atoms e.g., methyl, ethyl and the like.

The compounds of formula (VI) are prepared by heating a compound of formula (VIII) optionally in inert solvent such as ethers, e.g., ethyl ether or tetrahydrofuran, hydrocarbons or halogenated hydrocarbons such as hexane, heptane, benzene, toluene, o-dichlorobenzene and the like, at about 100°–220°C. preferably about 140°–160°C. for about 15 to 48 hours, preferably about 20 to 28 hours. The temperatures and times used are not critical. The reaction is preferably carried out in an inert atmosphere, e.g., nitrogen gas.

The compounds of formula (VII) may be prepared as indicated by the following reaction scheme:

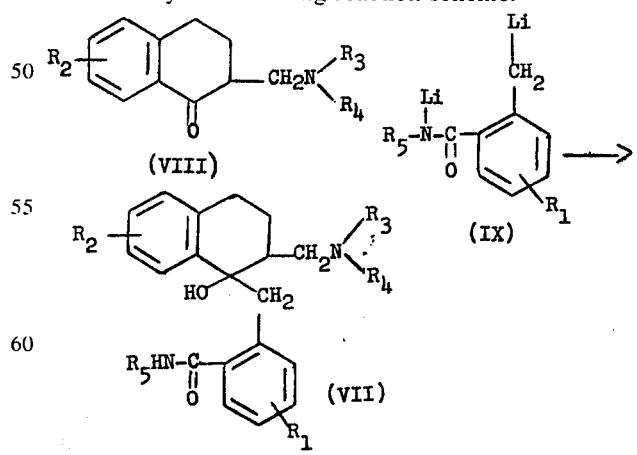

where $R_1$, $R_2$, $R_3$, $R_4$ are the proviso are as defined above.

The compounds of formula (VII) are prepared by condensing a compound of formula (VIII) with a compound of formula (IX) in the presence of inert atmosphere, e.g., nitrogen gas, in an inert solvent such as diethyl ether, tetrahydrofuran, hexane, heptane, benzene and the like or mixtures thereof, and subjecting the reaction mixture to hydrolysis, preferably with aqueous ammonium chloride. The condensation may be carried out at a temperature of from about −80° to 20°C., preferably −60° to −40°C. for about 1 to 3 hours. The hydrolysis is performed in a conventional manner at a temperature of about −20° to 0°C. Neither temperatures, solvents nor hydrolyzing agent are critical. Compound (VIII) is preferably added in inert solvent to a cold (−60° to −40°C) inert solvent of compound (IX).

The compounds of formulas (I), (II), (III), (V), (VI), and (VII) may be recovered using conventional techniques such as crystallization, evaporation or filtration.

Certain of the compounds of formulas (IV), (VIII) and (IX) are known and may be prepared by methods disclosed in the literature. Those compounds (IV), (VIII) and (IX) not specifically disclosed may be prepared by analogous methods from known starting materials.

It will be understood that certain of the compounds of formulas (I), (II) and (III) exist in racemic form or in the form of optically active isomers. The separation and recovery of the respective isomers may be readily accomplished employing conventional techniques and such isomers are included within the scope of this invention.

The compounds of formula (I) are useful because they possess pharmacological activity in animals. More particularly, the compounds of formula (I) are useful as anti-depressant agents as indicated by their activity in mice given intraperitoneally 0.1 to 25 mg/kg of body weight of the compound, and tested by the method basically as described by Spencer, P.S.J., Antagonism of Hypothermia in the Mouse by Anti-depressant Drugs, pp. 194–204, Ed. S. Garattini and M. N. G. Dukes, Excerpta Medica Foundation, 1967 and by their activity in the cat given typically 0.25 mg/kg of body weight of the compound and tested for their effect on 5-hydroxytryptophan and 1-tryptophan induced spinal monosynaptic reflex transmission, basically as described by Anderson, E. G. and Shibuya T., the Effects of 5-hydroxytryptophan and 1-tryptophan on Spinal Synaptic Activity, pp. 352 to 360, J. of Pharm. and Exp. Therapeutics, Vol. 153, No. 2, 1966.

When so utilized, the compounds may be combined with one or more pharmaceutically acceptable carrier or adjuvants. They may be administered orally or parenterally and, depending upon the compound empolyed and the mode of administration, the exact dosage utilized may vary.

Furthermore, the compounds (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as succinate, benzoate, acetate, p-toluenesulfonate, benzenesulfonate, maleate and the like As noted above, the compounds of formula (I) exist as optical isomers. In some cases, greater pharmacological activity or other beneficial attributes may be found for a particular isomer and in such instances, administration of such isomers may be preferred.

In general, satisfactory results are obtained when the compounds are administered as anti-depressants at a daily dosage of from about 0.5 to 100 milligrams per kilogram of animal body weight. This daily dosage is preferably given in divided doses, eg., 2 to 4 times a day, or in sustained release form. For most large animals, the total daily dosage is from about 30 to 750 milligrams and dosage forms suitable for internal administration comprise from about 7.5 to 375 milligrams of the compound in admixture with a solid or liquid pharmaceutical carrier or diluent.

EXAMPLE 1

α-(2-dimethylaminomethyl-1,2,3,4-tetrahydro-1-hydroxy-1-naphthyl)-N-methyl-o-toluamide To a flask equipped with a stirrer, dropping funnel, condenser and gas inlet tube maintained under a nitrogen atmosphere there is added at room temperature 40.0 g (0.28 mole) of o-methyl-N-methyl benzamide and 250 ml. of anhydrous tetrahydrofuran. The reaction flask is immersed in an ice bath and cooled to an internal temperature of 5°C. Stirring is initiated and 380 ml. of 1.6 M. n-butyllithium (0.616 mole) in hexane is added dropwise in ca. 1 hour maintaining the temperature below 8°C. The resulting red dilithio salt is stirred at 5°C. for 1 additional hour and the reaction flask is then immersed in a dry-ice acetone bath and cooled to an internal temperature of −60°C. To the cold reaction mixture a solution of 56.8 g. (0.28 mole) of 2-(dimethylaminomethyl)-3,4-dihydro-1-(2H)-naphthalenone in 140 ml. of anhydrous tetrahydrofuran is added dropwise in ca. 45 min. maintaining the temperature between −60°C. and −50° C. The resulting reaction mixture is stirred at −60°C. for 1 hour, allowed to warm to 0°C in ca 1 hour, and then treated with 200 ml. of saturated aqueous ammonium chloride while maintaining the temperature below 10°C. The resulting two layers are separated and the tetrahydrofuran layer is dried over magnesium sulfate, filtered and evaporated. The residue is chromatographed on silica gel with benzene; ethylacetate (1:1) to provide α-(2-dimethylaminomethyl-1,2,3,4-tetrahydro-1-hydroxy-1-naphthyl)-N-methyl-o-toluamide.

When the above process is carried out and in place of o-methyl-N-methyl benzamide there is used an equivalent amount of 4-fluoro-N-methyl-o-toluamide, there is obtained a. α-(2-dimethylaminomethyl-1,2,3,4-tetrahydro-1-hydroxy-1-naphthyl)-4-fluoro-N-methyl-o-toluamide.

When the above process is carried out and in place of o-methyl-N-methylbenzamide there is used an equivalent amount of 4-fluoro-N-methyl-o-toluamide and in place of 2-(dimethylaminomethyl)-3,4-dihydro-1-(2H)-naphthalenone, there is used an equivalent of 2-(dimethylaminomethyl)-3,4-dihydro-6-fluoro-1-(2H)-naphthalenone
there is obtained b. α-(2-dimethylaminomethyl-6-fluoro-1,2,3,4-tetrahydro-1-hydroxy-1-naphthyl)-4-fluoro-N-methyl-o-toluamide.

When the above process is carried out and in place of 2-(dimethylaminomethyl)-3,4-dihydro-1-(2H)-naphthalenone there is used an equivalent amount of 2-(diethylaminomethyl)-3,4-dihydro-1-(2H)-naphthalenone
there is obtained c. α-(2-diethylaminomethyl-1,2,3,4-tetrahydro-1-hydroxy-1-naphthyl)-N-methyl-o-toluamide.

EXAMPLE 2

2'-Dimethylaminomethyl-3',4'-dihydrospiro[isochroman-3,1'-(2H)-naphthalene]-1-one To a flask equipped with a stirrer, condenser and gas inlet tube maintained under a nitrogen atmosphere there is added at room temperature 17.6 g. (0.05 mole) of α-(2-dimethylaminomethyl-1,2,3,4-tetrahydro-1-hydroxy-1-naphthyl)-N-methyl-o-toluamide and 170 ml. of o-dichloro benzene. Stirring is initiated and the mixture is heated at reflux for 18 hours. The excess o-dichlorobenzene is then removed by distillation in vacuo and the resulting oil is crystallized from hot ethyl acetate to give 2'-dimethylaminomethyl-3',4'-dihydrospiro[isochroman-3,1'-(2H)-naphthalene]-1-one; m.p. 159°–163°C. The hydrochloride salt is prepared by dissolving the compound in ethanol and bubbling hydrogen chloride gas through the solution.

When the above process is carried out and in place of α-(2-dimethylaminomethyl-1,2,3,4-tetrahydro-1-hydroxy-1-naphthyl)-N-methyl-o-toluamide there is used an equivalent amount of a. α-(2-dimethylaminomethyl-1,2,3,4-tetrahydro-1-naphthyl)-4-fluoro-N-methyl-o-toluamide;

b. α-(2-dimethylaminomethyl-6-fluoro-1,2,3,4-tetrahydro-1-hydroxy-1-naphthyl)-4-fluoro-N-o-toluamide, or c. α(2-diethylaminomethyl-1,2,3,4-tetrahydro-1-hydroxy-1-naphthyl)-N-methyl-o-toluamide there is obtained the hydrochloride salt of a. 2'-dimethylaminomethyl-3',4'-dihydro-6-fluorospiro[isochroman-3,1'-(2'H)-naphthelene]-1-one b. 2'-dimethylaminomethyl-3',4'dihydro-6,6'-difluorospiro[isochroman-3,1'-(2'H)-naphthalene]-1-one, or c. 2'-diethylaminomethyl-3',4'-dihydrospiro[isochroman-3,1'-(2'H)-naphthalene]-1-one, respectively.

EXAMPLE 3

1,2,3,12a-tetrahydro-1-(dimethylaminomethyl)-7-methylene-7(12H)-pleiadene hydrochloride Step A: α-(2-dimethylaminomethyl-1,2,3,4-tetrahydronaphthalen-1-yl)o-toluic acid hydrochloride.

A solution of 17.85 g (0.05 mole) of 2'-dimethylaminomethyl-3',4'-dihydro-spiro[isochroman-3,1'-(2'H)-naphthalene]-1-one hydrochloride prepared by the above process in 150 ml. ethanol containing 1 g. 10% palladium on charcoal is hydrogenated at 50 psi and room temperature until one equivalent of hydrogen is absorbed. The mixture is filtered and evaporated to give the intermediate α-(2-dimethylaminomethyl-1,2,3,4-tetrahydronaphthalen-1-yl)-o-toluic acid hydrochloride m.p. 261°–263°C (dec.).

Following the above procedure and reducing the 2'-dimethylaminomethyl-3',4'-dihydrospiro[isochroman-3,1'-(2'-(2'H)-naphthalene]-1-one hydrochloride with zinc ammonium hydroxide in the presence of cupric sulfate, the identical product is obtained.

Step B: 1,2,3,12a-tetrahydro-1-(dimethylaminomethyl)-7(12H)-pleiadenone hydrochloride.

A mixture of 17.85 g. (0.05 mole) of α-(2-dimethylaminomethyl-1,2,3,4-tetrahydronaphthalen-1-yl)-o-toluic acid hydrochloride and 150 g. polyphosphoric acid is heated to 110° for 5 hours allowed to cool and poured onto crushed ice with stirring. The resulting solution is cooled on ice and made basic by the addition of solid potassium hydroxide, and extracted with methylene chloride. The methylene chloride is washed with water, dried over anhydrous magnesium sulfate and evaporated in vacuo. The residue is dissolved in isopropanol and treated with gaseous hydrogen chloride. The resulting precipitate is filtered and recrystallized from isopropanol to give the intermediate 1,2,3,12a-tetrahydro-1-(dimethylaminomethyl)-7(12H)-pleiadenone hydrochloride m.p. 262.5°–263.0°C.

Following the above procedure and using an equivalent amount of ferric chloride in place of polyphosphoric acid, there is obtained the identical product. Similarly, using ferric chloride and α-(2-dimethylaminomethyl-1,2,3,4-tetrahydronaphthalen-1-yl)-o-toluic acid chloride in place of α-(2-dimethylaminomethyl-1,2,3,4-tetrahydronaphthalen-1-yl)-o-toluic acid hydrochloride, the identical product is again obtained.

Following the above detailed procedure but using 22.55 g of α-(dimethylaminomethyl-1,2,3,4-tetrahydronaphthalen-1-yl)-o-toluic acid ethyl ester in place of 17.85 g. of α-(2-dimethylaminomethyl-1,2,3,4-tetrahydronaphthalen-1-yl)-o-toluic acid hydrochloride, there is obtained 1,2,3,12a-tetrahydro-1-(dimethylaminomethyl)-7(12H)-pleiadenone hydrochloride m.p. 262.5°–263.0°C.

Step C: 1,2,3,12a-tetrahydro-1-(dimethylaminomethyl)-7-methyl-7(12H)-pleiaden-7-ol.

To a solution of 21.4 g. (0.07 mole) 1,2,3,12a-tetrahydro-1-(dimethylaminomethyl)-7(12H)-pleiadenone in 200 ml. diethyl ether under nitrogen cooled to −5°C, there is added 70 ml. 1.5N methyllithium (0.105 mole) in diethylether dropwise with stirring maintaining the temperature below 0°C. Fifteen minutes after the addition is complete, the reaction is quenched by the addition of 50 ml. saturated ammonium chloride solution. The organic layer is separated, extracted with saturated sodium chloride solution, dried over anhydrous magnesium sulfate and evaporated. The crystalline residue is recrystallized from methylene chloride-methanol 1:1 to give the intermediate 1,2,3,12a-tetrahydro-1-(dimethylaminomethyl)-7-methyl-7(12H)-pleiaden-7-ol.

Following the above procedure and using an equivalent amount of methylmagnesium chloride in place of methyllithium at room temperature instead of 0°C for 3 hours instead of 15 minutes, the identical product is again obtained.

Step D: 1,2',3,12a-tetrahydro-1-(dimethylaminomethyl)-7-methylene-7-(12H)-pleiadene hydrochloride.

A mixture of 8.7 g. (0.027 mole) of 1,2,3,12a-tetrahydro-1-(dimethylaminomethyl)-7-methyl-7(12H)-pleiaden-7-ol and 250 ml 2M-sulfuric acid is refluxed for 2 hours. The mixture is cooled in ice and made basic by the addition of solid potassium hydroxide. The mixture is extracted with methylene chloride.

The methylene chloride extract is washed with water, dried over anhydrous magnesium sulfate and evaporated in vacuo. The oily residue is distilled at 140°C/0.5mm and the distillate is dissolved in ethanol and treated with maleic acid. The precipitate is filtered and recrystallized from diethylether-ethanol 1:1 to give 1,2,3,12a-tetrahydro-1-(dimethylaminomethyl)-7-methylene-7-(12H)-pleiadene hydrochloride m.p. 255.5°–257°C.

Following the above procedure and using an equivalent amount of ferric chloride in place of sulfuric acid, there is obtained the identical product.

EXAMPLE 4

Step A. Following the procedure of example 3, Step A and in place of 2'-dimethylaminomethyl-3'4'-dihydrospiro[isochroman-3,1'-(2'H)-naphthalene]-1-one, there is used an equivalent amount of
    a.    2'-dimethylaminomethyl-3',4'-dihydro-6-fluorospiro[isochroman-3,1'-(2'H)-naphthalen]-1-one,
    b.    2'-dimethylaminomethyl-3',4'-dihydro-6,6'-difluorospiro[isochroman-3,1'-(2'H)-naphthalene]-1-one, or
    c.    2'-diethylaminomethyl-3',4'-dihydrospiro[isochroman-3,1'-(2'H)-napthalene]-1-one, there is obtained.
    a.    4-fluoro-α-(2-dimethylaminomethyl-1,2,3,4-tetrahydronaphthalen-1-yl)-toluic acid hydrochloride,
    b.    4-fluoro-α-(2-dimethylaminomethyl-6-fluoro-1,2,3,4-tetrahydronapthalen-1-yl)-o-toluic acid hydrochloride, or
    c.    α-(2-diethylaminomethyl-1,2,3,4-tetrahydranapthalen-1-yl)-o-toluic acid hydrochloride respectively.

Step B Following the procedure of example 3, Step B) and in place of α-(2-dimethylaminomethyl-1,2,3,4-tetrahydronapthalen-1-yl)toluic acid hydrochloride, there is used an equivalent amount of
    a.    4-fluoro-α-(2-dimethylaminomethyl-1,2,3,4-tetrahydronapthalen-1-yl)-o-toluic acid hydrochloride,
    b.    4-fluoro-α-(2-dimethylaminomethyl-6-fluoro-1,2,3,4-tetrahydronapthalen-1-yl)-o-toluic acid hydrochloride, or
    c.    α-(2-diethylaminomethyl-1,2,3,4-tetrahydronapthalen-1-yl)toluic acid hydrochloride, there is obtained
    a.    10-fluoro-1,2,3,12a-tetrahydro-1-(dimethylaminomethyl)-7(12H)-pleiadenone hydrochloride,
    b.    5,10-difluoro-1,2,3,12a-tetrahydro-1-(dimethylaminomethyl)-7(12H)-pleiadenone hydrochloride or
    c.    1,2,3,12a-tetrahydro-1-(diethylaminomethyl)-7(12H)-pleiadenone hydrochloride, respectively.

Step C Following the procedure of example 3, Step C) and in place of 1,2,3,12a-tetrahydro-1-(dimethylaminomethyl)-7(12H)-pleiadenone, there is used an equivalent amount of
    a.    10-fluoro-1,2,3,12a-tetrahydr-1-dimethylaminomethyl)-7(12H)-pleiadenone hydrochloride,
    b.    5,10-difluoro-1,2,3,12a-tetrahydro-1-(dimethylaminomethyl)-7(12H)-pleiadenone hydrochloride, or
    c.    1,2,3,12a-tetrahydro-1-(diethylaminomethyl)-7(12H)-pleiadenone hydrochloride, there is obtained
    a.    10-fluoro-1,2,3,12a-tetrahydro-1-(dimethylaminomethyl)-7-methyl-7(12H)-pleiaden-7-ol,
    b.    5,10-difluoro-1,2,3,12a-tetrahydro-1-(dimethylaminomethyl)-7-methyl-7(12H)-pleiaden-7-ol, or
    c.    1,2,3,12a-tetrahydro-1-(diethylaminomethyl)-7-methyl (12H)-pleiaden-7-ol, respectively.

Step D Following the procedure of example 3, Step D, and in place of 1,2,3,12a-tetrahydro-1-(dimethylaminomethyl)-7-methyl-7(12H)-pleiaden-7-ol, there is used an equivalent amount of
    a.    10-fluoro-1,2,3,12a-tetrahydro-1-(dimethylaminomethyl)-7-methyl-7(12)-pleiaden-7-ol,
    b.    5,10-fluoro-1,2,3,12a-tetrahydro-1-(dimethylaminomethyl)-7-methyl-7(12H)-pleiaden-7-ol, or
    c.    1,2,3,12a-tetrahydro-1-(diethylaminomethyl)-7-methyl-7(12H)-pleiaden-7-ol, there is obtained
    a.    10-fluoro-1,2,3,12a-tetrahydro-1-(dimethylaminomethyl)-7-methyl-7(12H)-pleiadene hydrochloride,
    b.    5,10-difluoro-1,2,3,12a-tetrahydro-1-(dimethylaminommethyl(-7-methylene-7(12H)-pleiadene hydrochloride, or
    c.    1,2,3,12a-tetrahydro-1-(diethylaminomethyl)-7-methylene-7(12H)-pleiadene hydrochloride respectively.

What is claimed is:

1. A compound of the formula

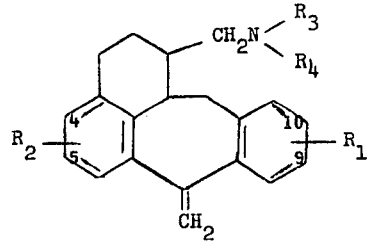

where
    $R_1$ and $R_2$ each independently represent hydrogen or fluoro, and
    $R_3$ and $R_4$ each independently represent lower alkyl of 1 to 2 carbon atoms,
provided $R_1$ is in the 9 or 10 position and $R_2$ is in the 4 or 5 position, or a pharmaceutically acceptable acid addition salt thereof.

2. A compound of claim 1 in free base form.

3. A compound of the formula

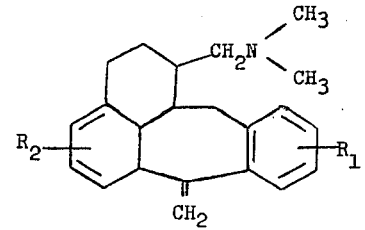

where $R_1$, $R_2$ and the proviso are as defined in claim 1.

4. A compound of the formula

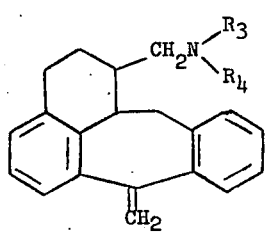
where $R_3$, $R_4$ and the proviso are as defined in claim 1.
5. The compound of claim 1 which is 1,2,3,12a-tetrahydro-1-(dimethylaminomethyl)-7-methylene-7(12H)-pleiadene hydrochloride.
* * * * *